Feb. 7, 1956        D. W. DRYG        2,733,801
INCLINED ROTATING ROD CONVEYOR
Filed June 13, 1951        3 Sheets-Sheet 3
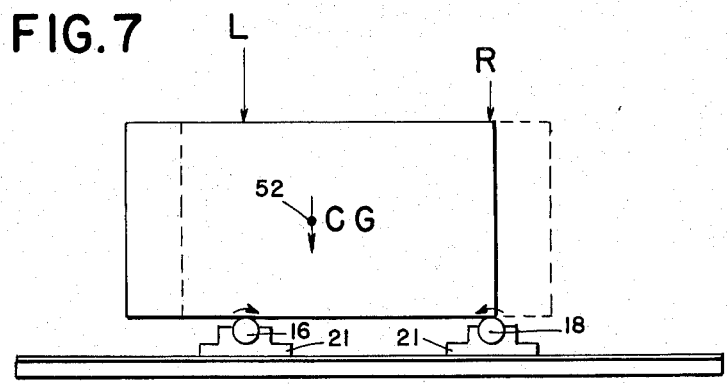
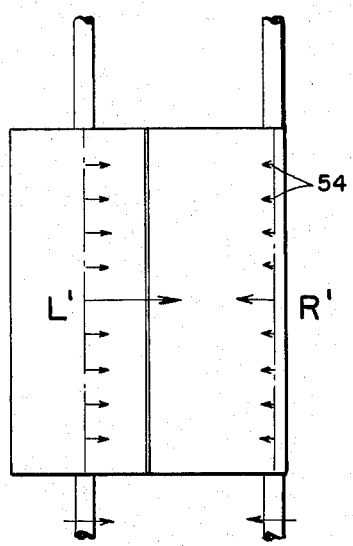
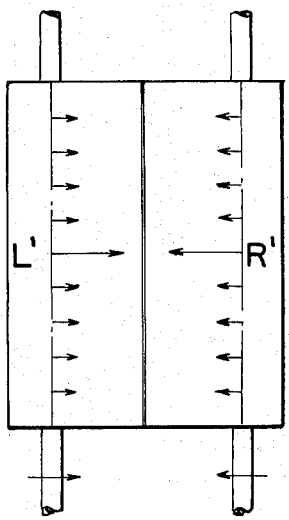
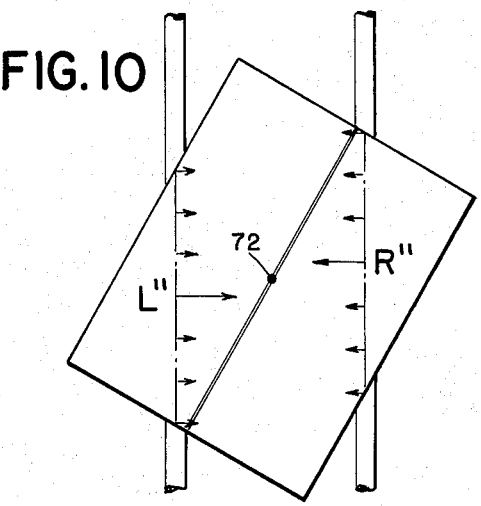
INVENTOR
DONALD W. DRYG
By William C. Stueber ATTORNEY

United States Patent Office 2,733,801
Patented Feb. 7, 1956

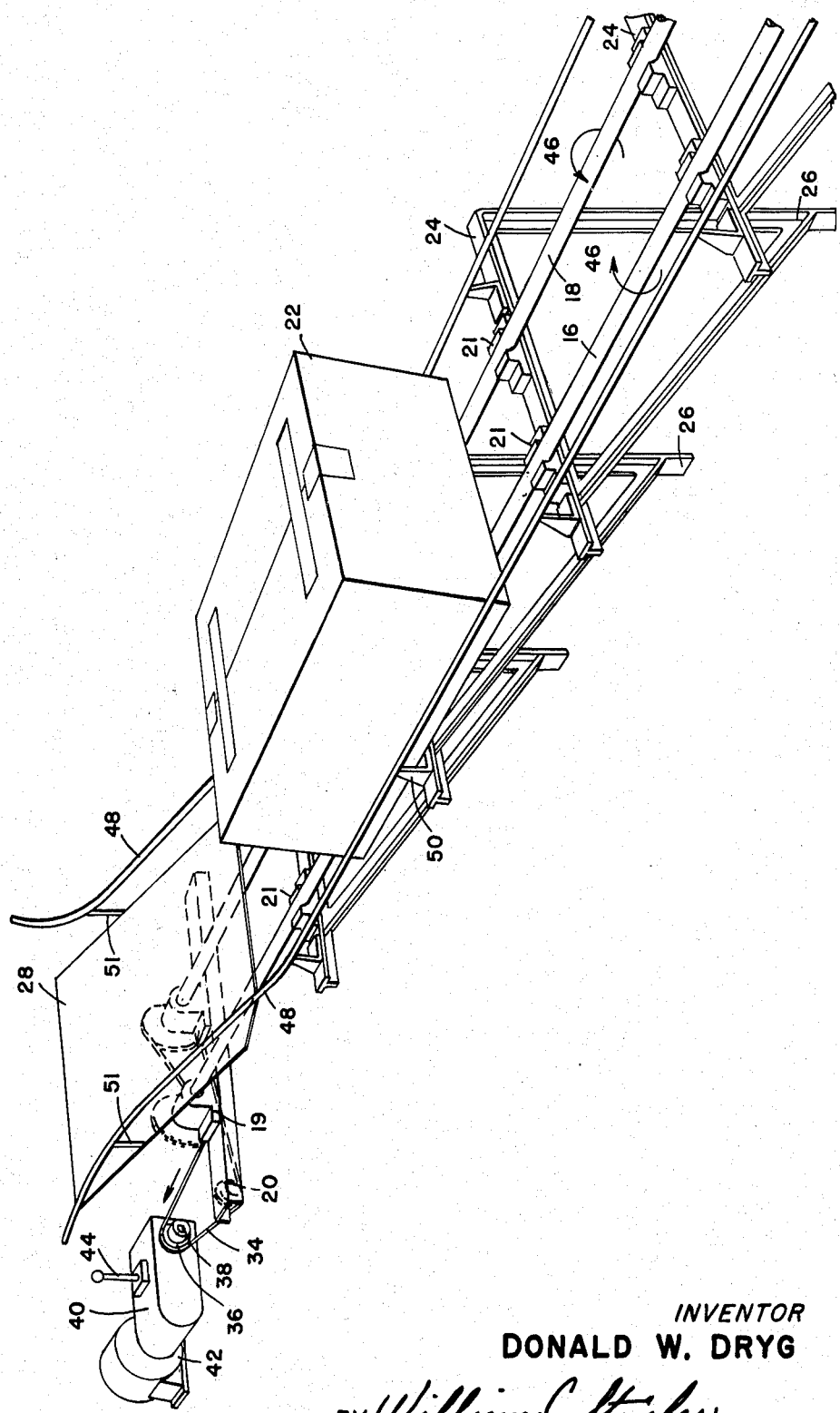

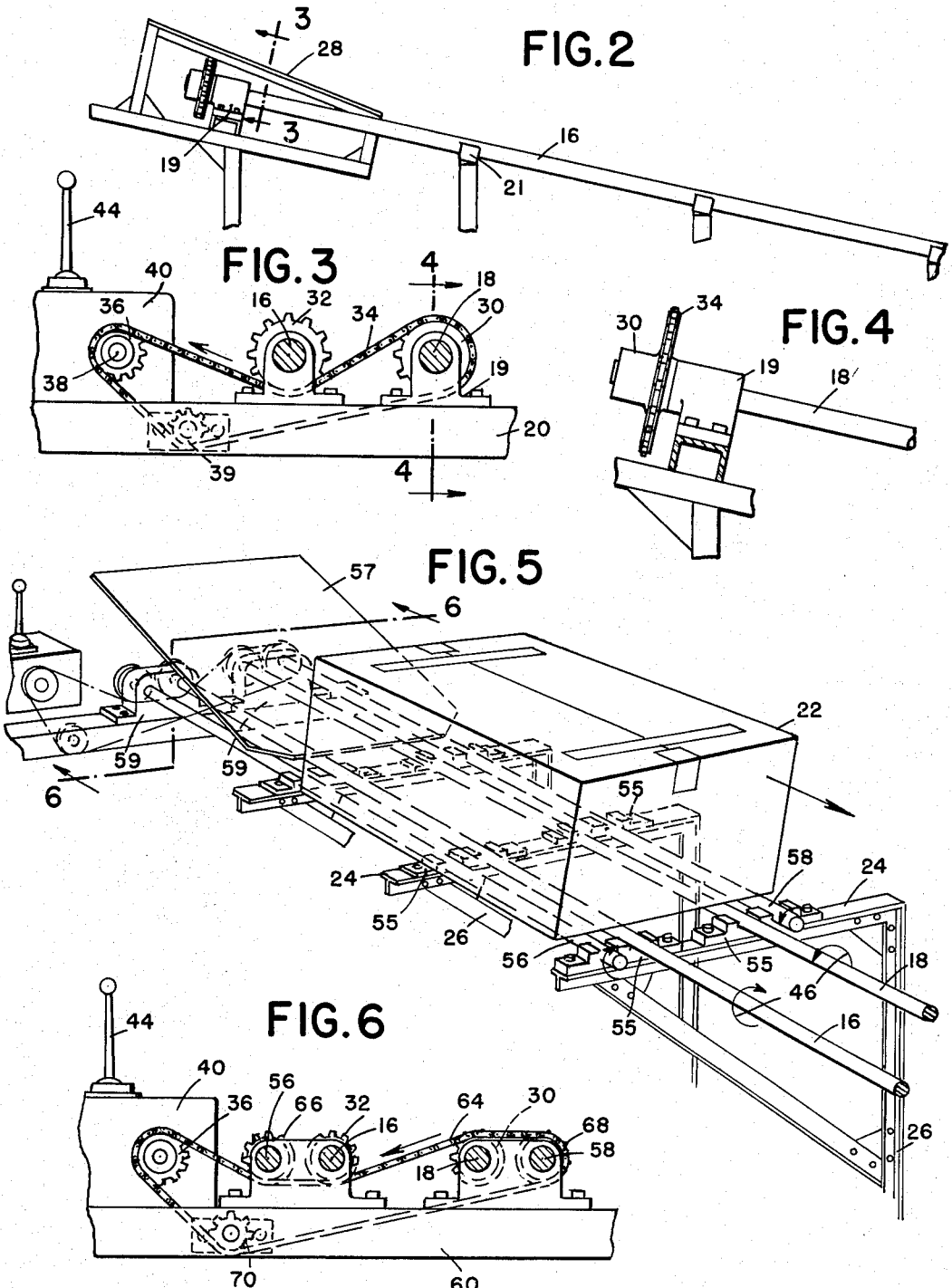

2,733,801

INCLINED ROTATING ROD CONVEYOR

Donald W. Dryg, Minneapolis, Minn., assignor to General Mills, Inc., a corporation of Delaware Application June 13, 1951, Serial No. 231,348

12 Claims. (Cl. 193—40)

This invention relates to improvements in conveyors and more specifically to a conveyor constructed of a pair of inclined rotating rods for conveying boxes from a higher to a lower level.

In conveying operations, as is the present practice, boxes which are to be conveyed are placed on the upper or the feed end of a conventional conveyor and removed from the lower or delivery end. The boxes generally arrive at the lower end in the same position which they were placed at the intake end of the conveyor. If an operation requires that the boxes for purposes of marking, stamping, filling or loading, assume a certain position, the operators must either manually orient them at the upper end of the conveyor or shift them into position at the lower end, both of which require extra time and effort.

A further problem which is frequently faced and which is not solved by conveyors heretofore used is the need for control of the flow of boxes. When the boxes are removed from the discharge end of the conveyor at an erratic pace, some provision must be made to control the speed of delivery. With a belt type conveyor this can be done either by shutting down the conveyor when the boxes are not removed from the lower end, or by holding them back while the conveyor continues operation. If the conveyor is stopped then the feeding of the conveyor at the upper end must also be stopped, and when the boxes are again rapidly removed from the discharge end of the conveyor to catch up they must be fed more rapidly at the upper end, thus requiring absolute coordination between the personnel feeding the receiving end of the conveyor and the personnel unloading at the discharge ends. If the boxes are held while the conveyor operates, the foremost boxes are crushed by the pressure of the rear boxes being pushed. This is also the difficulty with a roller type or chute type conveyor. Because of these other difficulties, the storage of a large number of boxes is not always practical with the conventional type conveyor.

The present invention contemplates the provision of a pair of simple rotating rods which when correctly positioned and operated solves the above problems and obviates the difficulties inherent with conveyors of the conventional type. Accordingly, among the objects of the present invention are the following.

An object of the present invention is to provide a simple, economical and rigid conveyor for conveying objects, such as boxes, from a higher to a lower level.

A further object of the invention is to provide a conveyor for conveying rectangular boxes which will automatically orient the box to a position where its longitudinal axis will be aligned with its direction of conveyance and wherein no means such as siderails need be provided to prevent the boxes from falling off the conveyor.

An object of the invention is to provide a conveyor which will readily provide a storage place for a great number of boxes, and with which the entire length of the conveyor may be filled with boxes without danger of crushing the foremost boxes from the pressure exerted due to the weight of boxes lined up behind it.

Another object of the invention is to provide a conveyor for conveying objects wherein the speed of motion of the objects conveyed may be easily and accurately controlled, and wherein the same control may be used to halt operation of the conveyor to permit it to function as a storage place for the conveyed objects.

A further object of the invention is to provide a conveyor which will always carry objects down its exact center and will automatically center the boxes on the conveyor, no matter how erratically they are placed on the receiving end, thereby obviating the danger of poorly positioned objects falling from the conveyor and eliminating the necessity of providing guide rails.

Other objects and advantages will become apparent from the following specification taken in connection with the attached drawings in which Figure 1 is a perspective view of the conveyor mechanism showing a rectangular box being conveyed downwardly;

Fig. 2 is a side elevation showing relative arrangement of the conveyor elements;

Fig. 3 is a sectional view taken along line 3—3 of Fig. 2 showing the arrangement of the driving mechanism;

Fig. 4 is a sectional view taken along line 4—4 of Fig. 3;

Fig. 5 is a perspective view showing an alternate construction of the invention;

Fig. 6 is a sectional view taken along line 6—6 of Fig. 5 showing the arrangement of the driving mechanism of the construction of Fig. 5;

Fig. 7 is a front elevation of a box being supported on a conveyor with the weight of the box indicated by arrows;

Fig. 8 is a schematic drawing viewing the box from the top showing the box on the conveying rods with force arrows indicating the unbalanced frictional forces of the rods acting upon the box;

Fig. 9 is a view of Fig. 8 illustrating the box centered on the rods; and

Fig. 10 is a schematic drawing viewing the box from the top showing the box twisted with respect to the conveying rods and illustrating the frictional forces by arrows.

The preferred embodiment of the invention is shown in Fig. 1, having a pair of smooth rods 16 and 18 positioned parallel to each other and being rotatably journaled at their upper ends in pillow blocks 19, the pillow blocks at the lower end not being shown but being similar to those at the upper end. A horizontal framepiece or header 20 supports the pillow blocks. The rods are inclined downwardly in the direction in which the box is to be conveyed and are preferably constructed solid, such as of rolled steel, or they may be of wood or hollow tubing. The rods are supported along their length by a series of half bearings 21 in which the rods freely rotate and which contact only the lower surface thereof so that they will not interfere with the box 22 which slides along the rods. The bearings are mounted on horizontal framepieces 24 which extend at right angles to the rods and are supported by suitable framework pieces 26. The bearings are positioned so that the distance between the rods is less than the narrowest dimension of the box. The reason for not permitting the spacing to be larger is because the box will always automatically turn to travel lengthwise down the bars.

Boxes are placed on an inclined feeder plate 28 positioned at the head or the upper end of the conveyor rods to slide onto the rods. The angle of inclination of the conveyor rods, as illustrated in Fig. 2, is critical, the inclination being such that when the rods are not being rotated and a box is slid thereon from the plate 28, the frictional contact between the box and the rods will prevent further sliding of the box. The angle of inclination which best serves the purposes and objects of the present conveyor is between 10° and 15°, although it will be obvious from the description of the principles of the conveyor that other angles may be used. The rods may be almost horizontal and operate satisfactorily or may be arranged to have an inclination so that the box almost slides of its own volition. A moderate inclination is preferred, however, as this will yield optimum control of the conveyed box.

For placing the conveyor in operation the rods are rotated and to this end sprockets 30 and 32 (Fig. 3) are secured to the upper end of the rods on the upper side of the pillow block 19. A sprocket chain 34 passes around the sprocket 30, and beneath and in engagement with the sprocket 32 to be driven by a drive sprocket 36 which is carried on a drive shaft 38 (Figs. 1 and 3). A tightener sprocket 39 adjustably mounted on the frame piece 20 engages the chain to adjust the tension. The drive shaft is the output shaft of a variable speed transmission enclosed in a box 40, the power input shaft being rotated by a pulley 42 which is driven by a suitable power means. The variable speed gear box is provided with a manual speed control handle 44 by which the speed of the rotation of the output shaft can be controlled. In conveying operation the rods are rotated so that their upper surfaces which are in contact with the box move toward each other, the rods turning in the direction indicated by the arrows 46.

Safety rails 48 are provided on each side of the conveyor, being held by supports 50 secured to the horizontal framepieces 24, and being held at their upper end by supports 51 mounted on the plate 28. The rails are close enough to the conveyor rods so that a box carelessly thrown on the rods will not, by its own inertia, slide off the sides of the conveyor.

The box, when placed on the rods, will automatically center itself so that it will have its center exactly between the two rods. The principle which causes this to occur may be easily understood by referring to the drawings of Figs. 7, 8 and 9. If the box begins its travel at the top of the conveyor, positioned so that its center, which is coincident with the center of gravity, as indicated by the arrow 52, is to the left of the center of the rods, then the left conveyor rod 16 will support a greater weight than the right conveyor rod 18. These weights may be represented by the vertical force vectors labeled L and R which are sized proportionally to the amount of force. The forces in the horizontal plane, which are due solely to the friction between the rotating rods and the box, are proportional to the vertical forces and therefore the resultant horizontal force, caused by the conveyor rod on the left, is greater than the force caused by the rod on the right. These resultant forces are indicated by the arrows L' and R'. These resultant forces are a summation of all the forces along the length of the box which are indicated by the small arrows 54. Since the forces acting in a horizontal plane urging the box to the right are greater than the horizontal forces urging the box to the left, the box will move to the right to seek a position where the forces are in equilibrium. If the box is moved too far to the right, more weight would be supported by the rod on the right and the forces urging the box to the left would become greater. The position of equilibrium is found when the box is exactly centered on the rods, as shown in Fig. 9. At this position the horizontal forces L' and R' become equal. Therefore, it may be seen that no matter if the box is placed either to one side or the other of the rods, it will always automatically be centered by the frictional forces which act upon the box due to the rods rotating therebeneath.

If the box has construction of the nature that it is not homogeneous in weight but the center of gravity is positioned at one side of the box, then the box will shift on the rods until the weight is evenly distributed between the two rods. An alternate embodiment of the conveyor is shown in Figs. 5 and 6. This structure does not require the provision of guide rails at the upper end of the conveyor.

Basically, the structure is the same as that shown in the other figures and its principles of operation with regard to the parallel rotating conveying rods are the same. This structure has the conveying rods 16 and 18 rotating in double half bearings 55 which are supported on the horizontal framepieces 24. These framepieces are supported by the framework 26. The rods are supported on their upper ends in double pillow blocks 59 secured to a header 60. A conveyor feeder plate 57 is positioned at the upper end of the conveyor and has a slope which is greater than that of the conveyor rods so that any object placed thereon will slide by its own weight onto the conveyor rods. If the object to be conveyed, such as a box 22, is so placed on the plate 57 that it slides to either side of the center of the conveyor, it will be prevented from falling off the conveyor by the centering rods 56 and 58. These rods are placed outwardly from and on each side of the main conveyor rods and are positioned in the same horizontal plane. The rods are supported in the double half-bearings 55 and in the double pillow blocks 59 in the same manner as the main conveyor rods. These rods are rotated in the same direction as the conveyor rod to which they are adjacent. That is, the centering rod 56, which is positioned outside the conveying rod 16, rotates in the same direction as the rod 16 and the rod 58, positioned outside the rod 18, rotates in the same direction as the rod 18.

If the box is slid off the plate 57 onto one side of the conveyor so that it will rest on one of the main conveyor rods and it is adjacent the centering rod, these rods rotating in the same direction will roll the box over toward the center of the conveyor and the box will not begin sliding downwardly until it is contacted by the rods on the opposite side of the conveyor. When both conveying rods are contacting the box, the opposing frictional forces in the horizontal plane will begin to equalize and the rods will commence sliding against the box permitting it to slide downwardly on the main conveyor rods. Since the centering rods are for purposes of centering, they extend only a short distance beyond the inclined plate. It will readily be seen that by placing more centering rods on each side of the conveyor, the receiving end may be widened, permitting boxes to be loaded further to either side of the conveyor.

A drive system similar to the first embodiment may be used. Fig. 6 shows the driving arrangement adapted to the embodiment shown in Fig. 5, having a chain 64 engaging the sprocket wheels 30 and 32 which are secured to the upper end of the main conveyor shafts 16 and 18. The sprocket chain also engages sprockets 66 and 68 which are attached to the centering rods 56 and 58, respectively. The chain also passes over the tightener sprocket 70 which is adjustably mounted on the header 60 for adjusting the tension of the chain. The chain is driven by the drive sprocket 36 mounted on the power output shaft of a variable speed transmission enclosed in the box 40.

An important feature of the conveyors which embody the principles of the present invention, is that boxes will always be automatically aligned so that their longitudinal axis will be parallel to the rotating conveyor rods. Since the boxes will always travel axially down the conveyor the rods must be spaced a distance apart less than the narrowest dimension of the box which is to be conveyed. No matter how the box is positioned on the rotating rods, it will always swing around so that its narrowest width is at right angles to the rods. This greatly facilitates removal of the boxes from the lower end of the conveyor especially where it is necessary that they be carried or stacked in one position and makes it very convenient for use with marking devices which mark a particular side of a carton.

The principle by which the box always turns so it will move in a lengthwise direction may be understood by observing the vector diagram of Fig. 10. The small arrows indicate the horizontal forces acting on the box. The force vector labeled R'' is the summation of horizontal forces acting upon the box due to its frictional engagement with the left hand rod and the vector labeled L'' is the summation of horizontal forces acting upon the box due to its frictional engagement with the right hand rod. It will be noticed in the drawing that the force component L'' acts along a line at one side of the center of the box indicated and the force component R'' acts along a line at the other side of the center of the box thereby forming a couple which tends to rotate the box until its longitudinal axis is parallel with the rotating rods. If the box swings too far, a couple will be formed acting in the other direction, tending to rotate the box back to longitudinal position. At the point of equilibrium the horizontal force components L'' and R'' will be acting exactly through the center of the box as indicated by the vectors in Fig. 8. The box will stay in equilibrium and will continue its trip down the conveyor rods in that position.

These force diagrams ignore the horizontal component of frictional force parallel to the rods. This force is due to the rods being inclined and does have some effect on the aligning of the boxes when they are not centered on the rods. Since these become equal when the forces shown have centered the box and since the important factors in the alignment of the boxes are the forces shown in Figs. 8 through 10, only those forces are considered in the analysis of the theory of operation.

The operator can easily control the speed at which the box is conveyed down the rotating rods by adjusting the speed of rotation of the rods by manipulation of the manual speed control handle 44. As the box is placed on the rotating rods it begins to slide downwardly, retarded only by the friction between it and the rods. It is axiomatic that as the relative speed between two members in frictional engagement increases, the frictional resistance becomes less. This, of course, is true only up to a certain critical point but the rods rotate at relatively low speeds which are well below the point where increased speed would increase the friction. The rods are preferably very smooth so that the friction between rods and box is small. This keeps the power requirements to a minimum and makes the speed of travel of the boxes highly responsive to changes in speed of rotation of the rods. Therefore, as the operator increases the speed of the rods, the frictional resistance to the box is decreased and their speed of descent down the inclined rods accordingly increases. If the operator desires to halt the conveyor, he needs only to stop the rotation of the rods, and the friction between the box and rods increases to stop the box.

If the occasion arises, when the operator wishes to push the boxes along the conveyor and off the end into a receiving or delivery station, the conveyor can be so slowed down that the boxes will not slide of their own volition but the speed is regulated so that the frictional contact between the rods and the boxes will become negligible and the boxes can be manually slid along the rods with a minimum of effort.

The conveyors can be used as a means for temporary storage of boxes when not in use, by merely holding the bottom box to prevent it from being carried off the lower end of the rotating rods. The boxes added at the top of the conveyor will then be carried against the solid line of boxes which will form on the rods and each succeeding box will be automatically aligned and centered on the rods. The conveyor rods can again be slowed to a point where the boxes are barely moving downward and thus the pressure of the long line of boxes on the foremost box can be kept very low preventing damage to the box. Thus a solid continuous line of boxes may easily be stored.

I have provided new and unique conveyors which obtain the objectives herein set forth and which are highly satisfactory for a great variety of uses. For example, a number of conveyors may be arranged in tandem with the speed of each controllable in order to use intermediate conveyors for storage and yet be able to feed the conveyors at an even rate and have a uniform delivery. In another adaptation, instead of controlling the speed of conveyance by changing the speed of rotation of the rods, the conveyor could be arranged to run at a constant speed and the flow of boxes controlled by altering the angle of inclination of the rods. It will be seen that the conveyor could be used in cooperation with a device for pushing the boxes, the rods providing the advantage that frictional resistance can be reduced to a point where it is negligible.

I have, in the drawings and specification, presented a detailed disclosure of the preferred embodiment of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. A device for conveying flat surfaced objects comprising a pair of conveying elements spaced from each other and having smooth cylindrical areas contacting the flat surface of the object and inclined downwardly, and means causing said contacting areas to have movement toward each other causing them to slide against the object to reduce the friction between the object and conveying elements so that the object will slide downwardly along said elements, the space between the conveying elements being less than the width of the flat surface of said objects.

2. A device for conveying objects comprising a pair of conveying rods spaced from each other and having smooth cylindrical surfaces contacting the object to be conveyed, and means to rotate the rods for conveying operation so that their surfaces contacting the objects will move toward each other to slide against said objects thereby reducing the friction between the rods and objects, the distance between the axis of the rods being less than the width of the contacted surface of said object.

3. A device for conveying objects comprising a pair of spaced cylindrical rods supporting the objects, and means for rotating the rods in a direction so that their upper cylindrical surfaces will be moving toward each other and sliding against the object to reduce the friction therebetween, said rods being inclined in the direction which the objects are conveyed so that when the friction is decreased by rotation the objects will tend to slide downwardly, the distance between the axis of the rods being less than the width of the contacted surface of said object.

4. A device for conveying objects comprising a pair of spaced smooth cylindrical rods upon which the objects are conveyed, and power means for rotating the rods so that their object supporting surfaces are moving toward each other, said rods being sloped in the direction of travel of the objects, the slope being of a degree so that the objects will remain at rest when said power means is inoperative and will slide when the power means is operating.

5. A device for conveying objects comprising a pair of inclined smooth cylindrical rods extending parallel to each other, and means for rotating said rods toward each other so that the objects will slide down the inclined rods, said rods being inclined so that the objects will stop sliding when the rods are not being rotated.

6. A device for conveying objects comprising elongated inclined rods positioned parallel to each other, a driving mechanism operatively connected to the rods to rotate them in a direction so that their object supporting surfaces are moving toward each other to cause objects to slide on the inclined rods, and means for varying the speed of said driving mechanism to vary the speed at which the objects slide on said rods.

7. A device for conveying objects having a flat lower supporting surface, and a pair of inclined smooth cylindrical rods for supporting said surface being parallelly spaced with their axis apart a distance less than the smallest dimension of said lower surface.

8. A device for conveying objects having a flat rectangular supporting surface, a pair of smooth inclined conveyor rods having a cylindrical surface upon which the objects rest, and means for rotating the rods with their upper contacting surfaces moving toward each other, said rods having their axis spaced a distance less than the smallest dimension of the container.

9. A device for conveying objects comprising a pair of long smooth cylindrical rods inclined and parallel to each other with both being at the same horizontal level, means for rotating the rods toward each other in order that the objects will be conveyed, and half journals arranged along the rod for lending upward support to the rods but not projecting above the upper surface of the cylindrical surface of the rod so as not to interfere with the sliding object.

10. A device for conveying objects comprising a pair of spaced conveying rods running parallel, a pair of centering rods arranged parallel to the conveying rods and positioned outside of said conveying rods, and means to rotate all the rods so that their upper surfaces on the opposing sides of the conveyor will move toward each other to center the object and then slide against said objects, thereby reducing the friction between the conveying rods and objects.

11. A device for conveying objects comprising a first rotatably mounted rod, a second rotatably mounted rod positioned parallel to said first rod and spaced therefrom, a third rotatably mounted rod spaced outwardly from said second rod and a fourth rod spaced outwardly from said first rod, and means to rotate said second and third rods in a direction so that their upper surfaces will move toward said first and fourth rods and for rotating said first and fourth rods so that their upper surfaces will move toward said second and third rods.

12. A device for conveying objects comprising first and second rods rotatably mounted and extending parallel to each other with one end lowered, third and fourth rods being rotatably mounted and being shorter than said first and second rods, the third rod being rotatably mounted outside the second rod and the fourth rod being rotatably mounted outside of the first rod, and means to rotate said second and third rods so that their surfaces will move toward the first and fourth rods and for rotating the first and fourth rods so that their upper surfaces will move toward the second and third rods.

References Cited in the file of this patent

UNITED STATES PATENTS

| Number | Name | Date |
|---|---|---|
| 580,742 | Vrooman | Apr. 13, 1897 |
| 1,415,932 | Hoy | May 16, 1922 |
| 1,564,926 | Armstrong et al. | Dec. 8, 1925 |
| 1,833,965 | Feller | Dec. 1, 1931 |
| 2,313,051 | Cutler | Mar. 9, 1943 |
| 2,366,256 | Harris et al. | Jan. 2, 1945 |
| 2,403,862 | Lakso | July 9, 1946 |
| 2,534,362 | Magnuson | Dec. 19, 1950 |
| 2,599,615 | Dahlberg | June 10, 1952 |